(12) United States Patent
Adam et al.

(10) Patent No.: US 11,093,619 B2
(45) Date of Patent: Aug. 17, 2021

(54) AUTOMATED FIXUPS BASED ON PARTIAL GOAL SATISFACTION

(71) Applicant: INTERNATIONAL BUSINESS MACHINES CORPORATION, Armonk, NY (US)

(72) Inventors: Constantin Adam, Fairfield, CT (US); Muhammed Fatih Bulut, New York, NY (US); Milton Hernandez, Tenafly, NJ (US); Anup Kalia, Elmsford, NY (US); John Rofrano, Mahopac, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 16/172,776

(22) Filed: Oct. 27, 2018

(65) Prior Publication Data
US 2020/0134190 A1    Apr. 30, 2020

(51) Int. Cl.
| | |
|---|---|
| G06F 11/00 | (2006.01) |
| G06F 21/57 | (2013.01) |
| H04L 29/06 | (2006.01) |
| G06F 11/36 | (2006.01) |
| G06F 21/62 | (2013.01) |

(52) U.S. Cl.
CPC ........ G06F 21/577 (2013.01); G06F 11/3604 (2013.01); H04L 63/107 (2013.01); H04L 63/1433 (2013.01); G06F 21/6245 (2013.01)

(58) Field of Classification Search
CPC . H04L 63/107; H04L 63/1433; G06F 21/577; G06F 2221/033; G06Q 10/00; G06Q 10/0635
USPC .......................................................... 726/25
See application file for complete search history.

(56) References Cited

U.S. PATENT DOCUMENTS

| | | |
|---|---|---|
| 6,192,360 B1 | 2/2001 | Dumais et al. |
| 8,028,269 B2 | 9/2011 | Bhatia et al. |
| 8,789,192 B2 | 7/2014 | LaBumbard |
| 9,003,537 B2 | 4/2015 | Raz et al. |
| 9,672,255 B2 | 6/2017 | Lange et al. |

(Continued)

OTHER PUBLICATIONS

Allodi, A. et al., "Attack Potential in Impact and Complexity"; ARES (2017); 6 pgs.

(Continued)

*Primary Examiner* — Samson B Lemma
(74) *Attorney, Agent, or Firm* — Intelletek Law Group, PLLC; Gabriel Daniel, Esq.

(57) ABSTRACT

A compliance of a system is managed. Internal parameters of the system are received. One or more compliance control documents that relate to the system are identified. Each compliance control document is decomposed into one or more auditable units. Auditable units that are relevant to the system, are identified. Relevant auditable units are mapped to a corresponding available executable code. Each mapped executable code is executed. A risk associated with each relevant auditable unit that is deemed to be not compliant is identified. For each compliance control document, a compliance risk is calculated based on the identified risk. A report of compliance risk for each document is created to be displayed on a user interface of a computing device.

20 Claims, 7 Drawing Sheets

(56) References Cited

U.S. PATENT DOCUMENTS

| | | | |
|---|---|---|---|
| 9,841,981 B2* | 12/2017 | Dimitrakos | G06F 9/5077 |
| 10,681,074 B2* | 6/2020 | Crabtree | H04L 63/1433 |
| 10,826,767 B2* | 11/2020 | Barkovic | G06Q 10/06393 |
| 2003/0069894 A1 | 4/2003 | Cotter et al. | |
| 2012/0102543 A1* | 4/2012 | Kohli | H04L 63/20 |
| | | | 726/1 |
| 2012/0116984 A1* | 5/2012 | Hoang | G06Q 10/10 |
| | | | 705/317 |
| 2012/0260263 A1 | 10/2012 | Edoja | |
| 2016/0080422 A1* | 3/2016 | Belgodere | G06N 5/046 |
| | | | 706/47 |
| 2018/0018737 A1 | 1/2018 | Drucker et al. | |
| 2018/0020021 A1* | 1/2018 | Gilmore | H04L 63/1441 |
| 2018/0373880 A1* | 12/2018 | Childress | G06N 3/08 |
| 2018/0375892 A1* | 12/2018 | Ganor | H04L 63/20 |
| 2019/0019184 A1* | 1/2019 | Lacey | G06Q 20/4016 |
| 2019/0222597 A1* | 7/2019 | Crabtree | H04L 63/1425 |
| 2019/0303541 A1* | 10/2019 | Reddy | H04L 9/0643 |
| 2020/0201962 A1* | 6/2020 | Brannon | G06F 21/554 |

OTHER PUBLICATIONS

Li, W. et al., "G-Finder: Routing Programming Questions Closer to the Experts"; OOPSLA/SPLASH (2010); 12 pgs.

Mell, P. et al., "Recommendations of the National Institute of Standards and Technology"; NIST Special Publication 800-145 (2011); 7 pgs.

Ruohonen, J. et al., "Mining Social Networks of Open Source CVE Coordination"; IWSM/Mensura (2017); 13 pgs.

\* cited by examiner

AUTOMATED FIXUPS BASED ON PARTIAL GOAL SATISFACTION

BACKGROUND

Technical Field

The present disclosure generally relates to computer systems, and in particular, to assessing compliance of a computerized system with respect to regulations.

Description of the Related Art

Today, there are an increasing number of regulations and expectations of operational transparency for organizations. In this regard, in an effort to streamline compliance requirements, organizations may use consolidated controls to ensure that the relevant governance requirements are met. Compliance may involve conforming to various rules, specification, standards, or policies, collectively referred to herein as regulations. Regulations can be different for different industries and geographical locations. Compliance software can be used to validate compliance with various standards.

SUMMARY

According to various embodiments, a computing device, a non-transitory computer readable storage medium, and a method are provided for managing a compliance of a system. Internal parameters of the system are received. One or more compliance control documents that relate to the system are identified. Each compliance control document is decomposed into one or more auditable units. Auditable units, from the one or more auditable units of each control document, that are relevant to the system, are identified. For each relevant auditable unit, the relevant auditable unit is mapped to a corresponding available executable code, operative to determine whether the auditable unit is compliant with its corresponding compliance control document. Each mapped executable code is executed. A risk associated with each relevant auditable unit that is deemed to be not compliant is identified by its corresponding executable code. For each compliance control document, a compliance risk is calculated based on the identified risk. A report of compliance risk for each document is created to be displayed on a user interface of a computing device of the system.

In one embodiment, a risk associated with each relevant auditable unit that cannot be mapped to a corresponding executable code of a technology stack is identified. The calculation of the compliance risk includes the identified risk associated with each relevant auditable unit that cannot be mapped.

In one embodiment, the internal parameters of the system include at least one of: a type of industry of the system; a geographical location of the system; a hardware infrastructure of the system; or a software infrastructure of the system. In one embodiment, the internal parameters of the system further include at least one of: internal regulations of the system; or an interpretation of regulations by the system of one or more control units of the one or more compliance control documents.

In one embodiment, for each relevant auditable unit that cannot be mapped to a corresponding executable code of the technology stack, the relevant auditable unit is decomposed into sub-units. Each sub-unit is mapped to a corresponding available executable code from the technology stack.

In one embodiment, for at least one relevant auditable unit that cannot be mapped to a corresponding executable code of the technology stack, parameters of the auditable unit are distributed on social media to crowdsource an executable code operative to determine whether the auditable unit is compliant with is corresponding compliance control document. The executable code for the auditable unit is then received via crowdsourcing.

In one embodiment, an executable code of a subject mapped relevant auditable unit is operative to, upon determining that the subject auditable unit is not compliant, adjust one or more internal parameters of the system to achieve compliance for the subject auditable unit.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, the present disclosure relates to systems and methods of automatically assessing compliance of a computerized system (sometimes referred to herein as a client domain), determining compliance risk involved, and providing solutions to mitigating compliance risk. Today, there is an ever-increasing number of regulations that may involve certification. Regulations can be different for different industries and geographical locations. For example, the financial industry includes the Gramm-Leach-Bliley Act (GLBA); the Payment Card Industry Data Security Standard (PCI DSS); the Federal Financial Institutions Examination council (FFIEC); the food and beverage industry includes the Hazard analysis and critical control points regulation (HACCP); the healthcare industry includes the Health Insurance Portability and Accountability Act (HIPAA); the United States federal agencies include the Federal Information Security Management Act (FISMA); the standards industry includes the National Institute of Standards and Technology (NIST), the European Union includes the General Data Protection Regulation (GDPR); etc. Compliance software is often used to validate compliance with various standards. New regulations may be introduced and old regulations changed. Some client domains may pertain to overlapping industries and there may be additional internal parameters (e.g., regulations), which may be more stringent than outside regulations.

Accordingly, what is provided herein are methods and systems of managing the compliance of a computerized client domain in view of a dynamic environment of regulations. To that end compliance control documents that are relevant to a client domain are identified and decomposed into auditable units. Each auditable unit is mapped to executable code. For each auditable unit that cannot be mapped or is not compliant, a compliance risk is identified and reported. In some scenarios, non-compliance is automatically fixed to achieve compliance.

By virtue of the concepts discussed herein, in various aspects, the time involved in identifying the compliance of a client domain can be efficiently assessed, compliance issues cured, and a compliance risk assessed. The system not only determines compliance, but also facilitates compliance, and provides an infrastructure that can readily pass an audit. Reference now is made in detail to the examples illustrated in the accompanying drawings and discussed below.

Example Architecture

Figure 1:
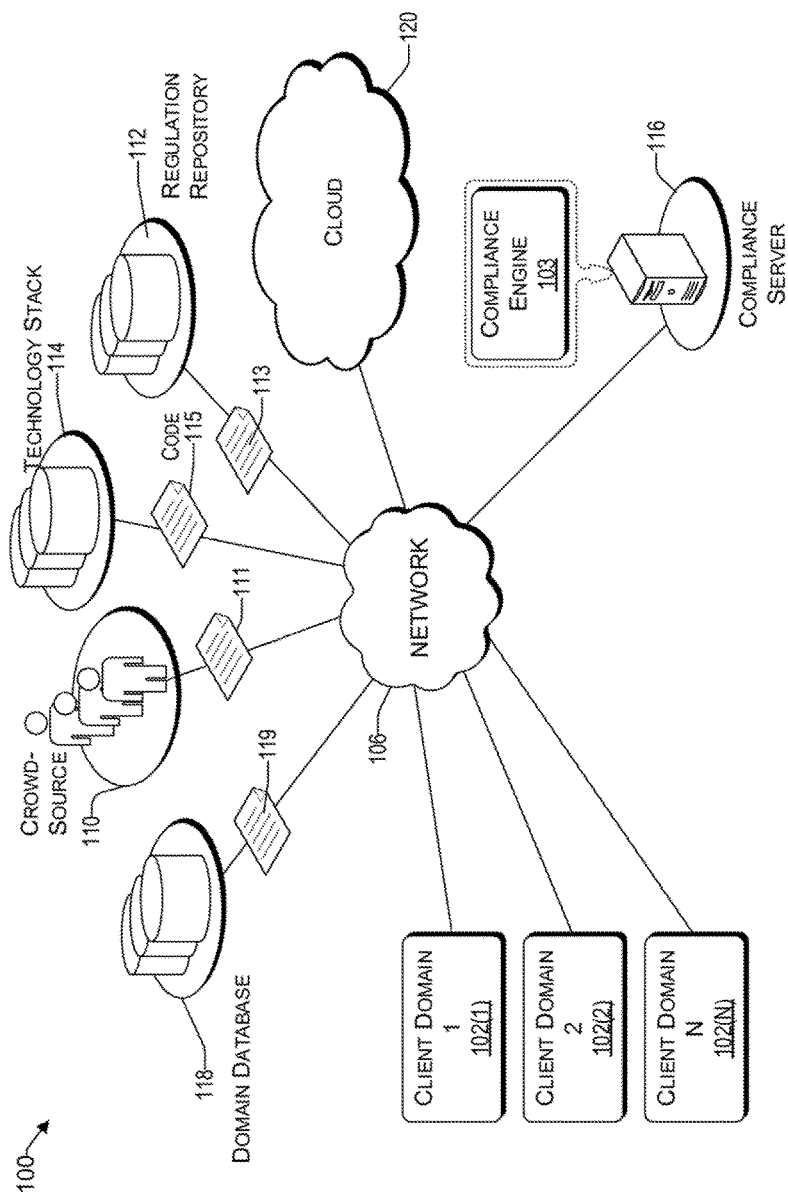
FIG. 1 illustrates an example architecture of a compliance management system.

FIG. 1 illustrates an example architecture 100 of a compliance management system. Architecture 100 may include a regulation repository 112, a technology stack 114, a domain database 118. The architecture 100 further includes one or more client domains 102(1) to 102(N) that use the services discussed herein.

The architecture 100 includes a compliance server 116 that hosts a compliance engine 103. There is a network 106 that allows the compliance engine 103 to communicate with various resources connected to the network 106, such as the regulation repository 112, technology stack 114, domain database 118, crowdsource element 110, one or more client domains 102(1) to 102(N), and the cloud 120. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various application stores, libraries, the Internet, and the cloud 120.

There may be a crowdsource element 110 that includes individuals or organizations that may be knowledgeable (e.g., experts) regarding matters related to regulations and/or technologies that facilitate compliance therewith. For example, the crowdsource element 110 may provide code to test different aspects of regulations. Stated differently, the crowdsource element 110 can be used as a resource to the compliance engine 103 to (i) find appropriate test code to test one or more aspects of a regulation, and/or (ii) provide a solution to how to pass an aspect of a regulation.

The regulation repository 112 is configured to store and maintain an up-to-date list of regulations, referred to herein as compliance control documents, for various industries. For example, the regulation repository 112 may be maintained by a consortium of organizations and/or individuals interested in maintaining various regulations for different industries. In one embodiment, the compliance engine 103 can, at predetermined intervals or at a trigger event, consolidate (e.g., collect) latest regulations from various sources and store them in the regulation repository 112.

By way of example, a rule of a compliance control document 113 may be "all passwords must include at least eight characters, a number, a capital letter, and a special character." Additional rules of a compliance control document 113 may be "access to designated facilities require additional biometric information," or "the temperature of a facility cannot go below a predetermined threshold, which is to be confirmed at eight-minute intervals," "surveillance information must be stored for at least 90 days at a remote repository," etc.

Industry standards include a compliance domain that is external to a company (e.g., client domain), which is useful for certification of a client domain's product, or capabilities, and are adhered to in order to improve interoperability of applications and systems, as well as attest to a specified level of quality. In addition, there may be internal parameters of a client domain, which may include the infrastructure (physical properties, hardware, and software of the client domain) as well as internal regulations. For example, the internal regulations may be additional quality control measures that are implemented by the client domain to not only achieve compliance with regulations but to achieve a higher quality product or service. In one embodiment, the internal parameters 119 of a client domain are stored in a domain database 118, which may be the same or different for each client domain (102(1) to 102(N)).

The technology stack 114 represents one or more databases that include existing code that is able to test aspects of a compliance control document. For example, a compliance control document may have various regulations to follow. These can be later represented by auditable units, each operative to provide one or more criteria for compliance that can be tested. For example, each auditable unit provides a compliance requirement or check. To that end, the technology stack 114 may provide, for each auditable unit, a code 115 that can fulfil the testing. Stated differently, the technology stack 114 provides a library of test code that can be applied for corresponding auditable units of a compliance control document.

The compliance engine 103 can use the regulation repository 112 to receive one or more compliance control documents 113 that are relevant to a particular client domain (e.g., 102(1)). In various embodiments, the retrieval may be performed at predetermined intervals or upon a trigger event, such as a request from the client (e.g., 102(1)), introduction of a new regulation, introduction of a new asset to the client domain, and the like. Not every aspect of a compliance control document may be relevant to a particular client domain. The compliance engine filters auditable units of each compliance control document such that it is in harmony with the particular client domain. To that end, the compliance engine 103 can receive internal parameters 119 of a client domain (e.g., 102(1)) from the domain database 118. The internal parameters 119 can also indicate any internal interpretations and/or additional requirements of the client domain (e.g., 102(1)).

The compliance engine 103 can then use the technology stack 114 and/or the crowdsource element 110 to find relevant executable code to implement a compliance blueprint for the client domain (e.g., (102(1)) to determine the compliance thereof, determine a risk of non-compliance, and make automatic adjustments to internal parameters of the client domain (e.g., 102(1)) to reduce the risk and/or achieve compliance. By virtue of using of using a crowdsourcing element 110, the management of the system experiences improved costs, speed, quality, flexibility, scalability, and/or diversity.

The compliance control documents 113 received from the regulation repository 112 and/or the internal parameters 119 may include natural language content. In one embodiment, the compliance engine 103 uses natural language processing (NLP) to process the raw natural language content. For example, the natural language content may be provided as a text. In one embodiment, concept expansion, such as the IBM Watson concept expansion, can be used to identify the concept cues in the compliance control documents 113 and/or the internal parameters 119 to determine the intent thereof. In this regard, large sets of unstructured sets of data may be provided to the compliance engine 103, such that it can learn therefrom. The large sets of unstructured data may relate to prior compliance control documents 113 and/or internal parameters 119 that were successfully processed by the compliance engine 103, which now acts as a corpus of data to learn from. Such concept expansion enables the creation of a specialized dictionary for the cognitive application of identifying the subject matter and scope of each requirement of the compliance control document 113 and/or internal parameter 119, collectively referred to herein as the "intent" of the data. Concept expansion enables the compliance engine 103 to build a specialized dictionary for the cognitive application of interacting with documents that include raw natural language. Accordingly, the compliance engine 103 can correctly understand industry specific terminology, local euphemisms, and colloquial terms that may be included as input data from either the client domain, the domain database 118, or the regulation repository 112.

Upon execution of each auditable unit of a compliance control document 113 related to a client domain (e.g., 102(1)), the compliance engine 103 can determine what auditable units are non-compliant, and which auditable units could not be mapped to executable code for testing. In some embodiments, upon determining that an auditable unit is non-compliant, the compliance engine 103 can use the corresponding executable code to cure the issue. Auditable units that are non-compliant or could not be mapped to an executable code for testing are assessed for risk. The results are then reported to an appropriate administrator of the client domain. An appropriate administrator may be individuals, organizations, or any other suitable entity that may be affected by the identified compliance risk, including the regulation repository 112. The report may be sent in various ways, such as common short code (CSC) using a short message service (SMS), multimedia message service (MIMS), e-mail, telephone, social media, etc. In various embodiments, the report can be provided on a user interface of a computing device in the form of a message on the screen, an audible tone, a haptic signal, or any combination thereof.

While the domain database 118 is illustrated by way of example to be separate from a client domain, it will be understood that in some scenarios each client domain has a domain database embedded therein. Similarly, while the compliance server 116, regulation repository 112, and the technology stack 114 are illustrated by way of example to be on different platforms, it will be understood that in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. The cloud 120 is discussed in more detail later.

Example Block Diagram

Figure 2:
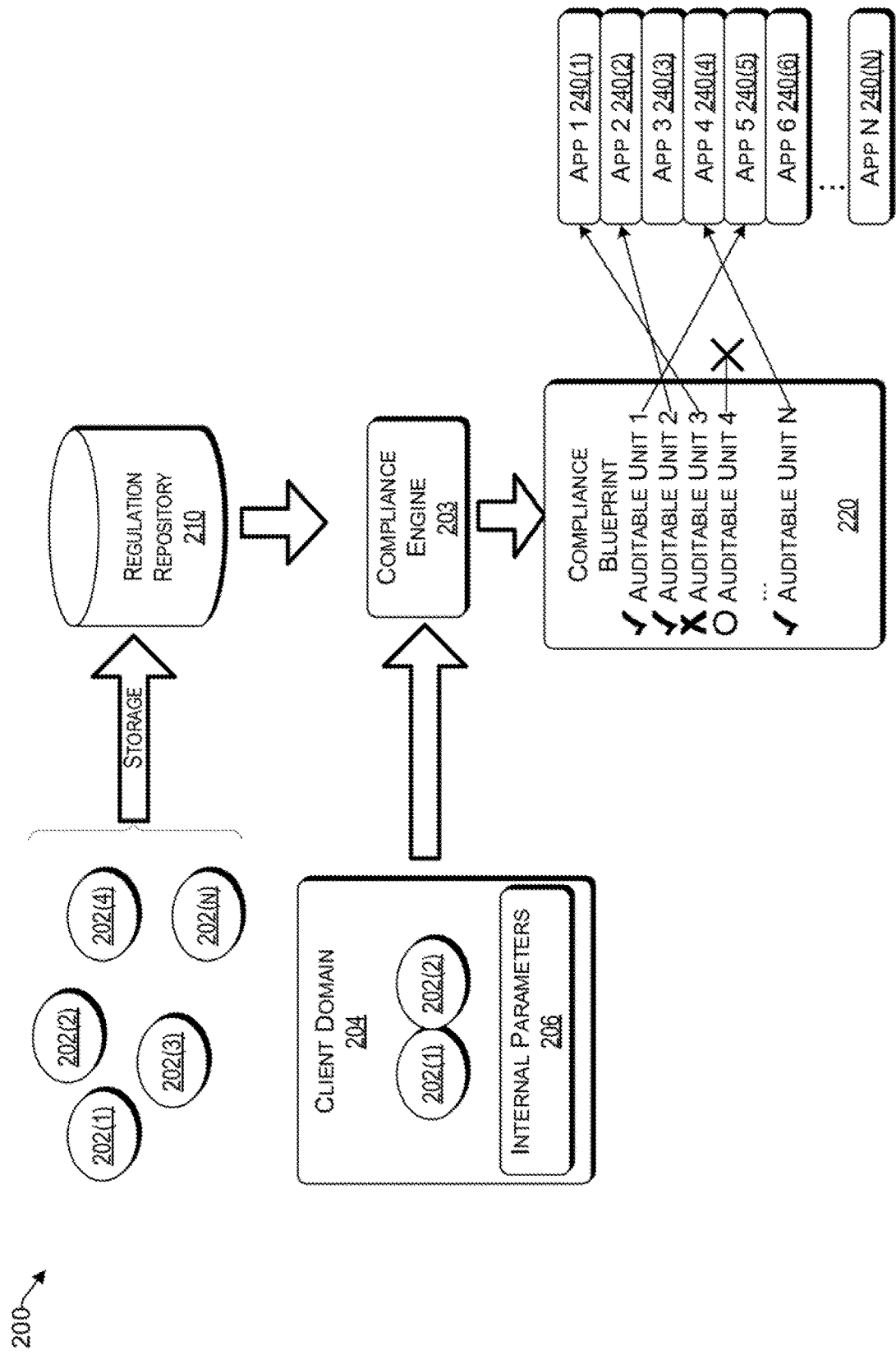
FIG. 2 is an example block diagram of a system that is configured to map regulations with executable code to assess compliance of a client domain.

Reference now is made to FIG. 2, which is an example block diagram of a system 200 that is configured to map regulations with executable code to assess compliance of a client domain. The regulation repository 210 is configured to store and maintain an up-to-date list of compliance control documents 202(1) to 202(N) for various industries, which may be overlapping in scope. At predetermined intervals, or upon a trigger event, the compliance engine may determine a level of compliance of a target environment, represented by the client domain 204. In some embodiments, the compliance engine 203 can also determine a compliance risk and provide solutions to achieve compliance.

For example, the compliance engine 203 receives internal parameters 206 of the client domain 204. Internal parameters 206 may include, without limitation, a type of industry, geographical location, physical attributes (sometimes referred to as hardware infrastructure), software infrastructure used in the client domain 204, internal interpretation of regulations or internal regulations.

For example, the hardware infrastructure may describe physical attributes of a client domain 204 that include a size of a facility, the number of surveillance cameras, the number of entrances, number and size of refrigeration units, number of employees, etc. The software infrastructure may describe operating systems, device drivers, utilities applications, malware protection, etc., of a client domain 204. As mentioned previously, the internal regulations may be additional quality control measures that are implemented by the client domain 204 to not only achieve compliance with regulations, but to achieve a higher quality product or service.

Based on the internal parameters 206 of a client domain 204, the compliance engine 204 can receive one or more compliance control documents (202(1) and (202(2) in the present example) from the regulation repository 210 that relate to the client domain 204. For example, the compliance control documents that are received from the regulation repository 210 are based on the type of industry and the geographical location of the client domain 204. For each compliance control document, the compliance engine 203 identifies auditable units.

In some scenarios, not all identified auditable units may directly relate to the subject client domain 204. In one embodiment, the compliance engine 203 filters out auditable units that are not directly related and retains only those that are relevant. To that end, the compliance engine 203 uses the internal parameters 206, such as the hardware and software infrastructure, of the client domain 204. For example, a compliance control document may require all operating systems to have a latest update. Such requirement may be decomposed by the compliance engine 103 to separate auditable units for Microsoft Windows, macOS, Linux, Apple iOS, and Android. However, the software infrastructure may indicate that only Microsoft Windows and Android operating systems are used in the client domain 204. Accordingly, by using the internal parameters 206, the compliance engine 203 can filter out the irrelevant (e.g., non-compatible) auditable units and retain the relevant auditable units.

In some embodiments, the compliance engine 203 introduces additional auditable units and/or replaces existing auditable units with those that are based on internal interpretation of regulations and/or internal regulations of the client domain 204. For example, a compliance control document may require password protection. Internal parameters may interpret this requirement by specifying a minimum length of the passwords, the types of characters that should and/or should not be used, whether multi-factor authentication is to be used, etc. Thus, the identified auditable units can be expanded and/or replaced with internal parameters to the extent that they further fine-tune the regulation.

The compliance engine 220 can then create a compliance blueprint 220 of the resulting auditable units, which can be viewed as a compliance checklist for the particular client domain 204. The compliance engine 203 maps each auditable unit of the compliance blueprint 220 with existing executable code, represented by Apps 1 to N (240(1)) to 240(2)) in the example of system 200. By way of non-limiting example, mapping can be performed by way of a knowledge base (e.g., stored in the technology stack 114) that indicates what executable code relates to an auditable unit. In various embodiments, the knowledge base may be created manually (e.g., by an expert) or automatically by way of machine learning. In machine learning the (i) code documentation, (ii) packages upon which the code depends, and (iii) dialogues about the code in forums (e.g., GitHub issues, forum questions and answers, etc.,) can be used to infer whether the code can be used to check or remediate the checks specified in an auditable unit for a specific platform or application.

Each app is operative to determine (e.g., test or monitor) a compliance of its corresponding auditable unit and/or provide a solution to achieve compliance thereof. For example, auditable unit 3, which is mapped to app1 (240(1)), may require multi-factor authentication. App 1 (240(1)), upon determining that multi-factor authentication is not in place for client domain 204, may adjust the authentication protocol in the client domain 204 to include multi-factor authentication.

In one embodiment, approval from an appropriate authority, such as an administrator of the client domain 204, would be solicited by the compliance engine 203 before the automatic update of the authentication protocol would be implemented. The requested for approval may be sent in various ways, such as common short code (CSC), using a short message service (SMS), multimedia message service (MMS), e-mail, telephone, social media, etc. A request can be provided on a user interface of a computing device of a system administrator of the client domain 204, in the form of a message on the screen, an audible tone, a haptic signal, or any combination thereof.

In some scenarios, the compliance engine cannot readily map an auditable unit with an appropriate executable code from a technology stack, represented by way of example as auditable unit 4 in FIG. 2. In one embodiment, the compliance engine can solicit a solution to the technical problem via crowdsourcing. For example, parameters of the auditable unit may be distributed via one or more social media networks to solicit an appropriate executable code or a location where such code can be sourced.

In another embodiment, the compliance engine 203 uses artificial intelligence (AI) to source the executable code for an auditable unit that cannot be readily mapped in a predetermined technology stack. For example, the compliance engine can use a corpus of data based on auditable units that were previously successfully mapped to corresponding executable code. Based on the machine learning, patterns, trends, and key words that are consistent with features of an auditable unit are identified. In various embodiments, the machine learning discussed herein may be supervised or unsupervised. In supervised learning, the compliance engine 203 may be presented with example data as being acceptable. Stated differently, the example data acts as a teacher for the compliance engine 203. In unsupervised learning, the compliance engine 203 is not provided with any labels as what is acceptable, rather, it simply provides historic audible unit data to the compliance engine 203 that can be used to find its own structure among the data to determine an appropriate source for the executable code. In various embodiments, the machine learning may make use of techniques such as supervised learning, unsupervised learning, semi-supervised learning, deep learning, naïve Bayes, Bayesian networks, decision trees, neural networks, fuzzy logic models, and/or probabilistic classification models to find a source for an executable code for an auditable unit.

If an auditable unit cannot be mapped to an executable code, in one embodiment, the subject auditable unit (auditable unit 4 in the present example) can be decomposed into smaller auditable units for which a substantial solution can be found. For example, an auditable unit (e.g., auditable unit 4) can be decomposed into six smaller sub-units, five of which have suitable code in the technology stack to be mapped to. In this way, even though not all aspects of the auditable unit can be accommodated, a substantial compliance can be achieved, thereby reducing compliance risk. This concept will be discussed in more detail later in the context of the discussion of risk assessment. Such approach may be taken, for example, if crowdsourcing and AI have not been successful in finding an appropriate executable code.

In one embodiment, the compliance engine 203 is configured to determine a compliance risk of each auditable unit in the blueprint 220. For example, each auditable unit is associated with a risk. The actual risk can be obtained from a reference table that may be stored in a regulation repository, such as the regulation repository 112 of FIG. 1. An auditable unit may have a different risk associated with it based on the industry of the client domain. It will be understood that some auditable units will have a higher priority (i.e., higher associated risk) than others. Upon execution, if a code mapped to an auditable unit determines that an auditable unit is non-compliant, its status is recorded in a memory of the compliance server 116, represented by way of example by an "X" before auditable unit 3. Similarly, if an auditable unit cannot be successfully mapped to an executable code, then it may also be marked with an appropriate indicium (e.g., a hollow circle in the present example in front of auditable unit 4). For each compliance control document for the client domain 204, the risk for auditable units that (i) are not compliant and (ii) were not able to be mapped, is tabulated and reported. For example, the report may indicate whether the client domain 204 is compliant or the level of compliance risk that it is exposed to.

The auditable units of the compliance blueprint 220 have been shown to have a numerical listing by way of example only and not by way limitation. In various embodiments, the mapping and/or execution of the corresponding executable code of an auditable unit can be performed in parallel, in series, or a combination thereof. In one embodiment, auditable units are ranked in terms of risk exposure and are evaluated in their order of risk exposure.

Example Processes

Figure 3:
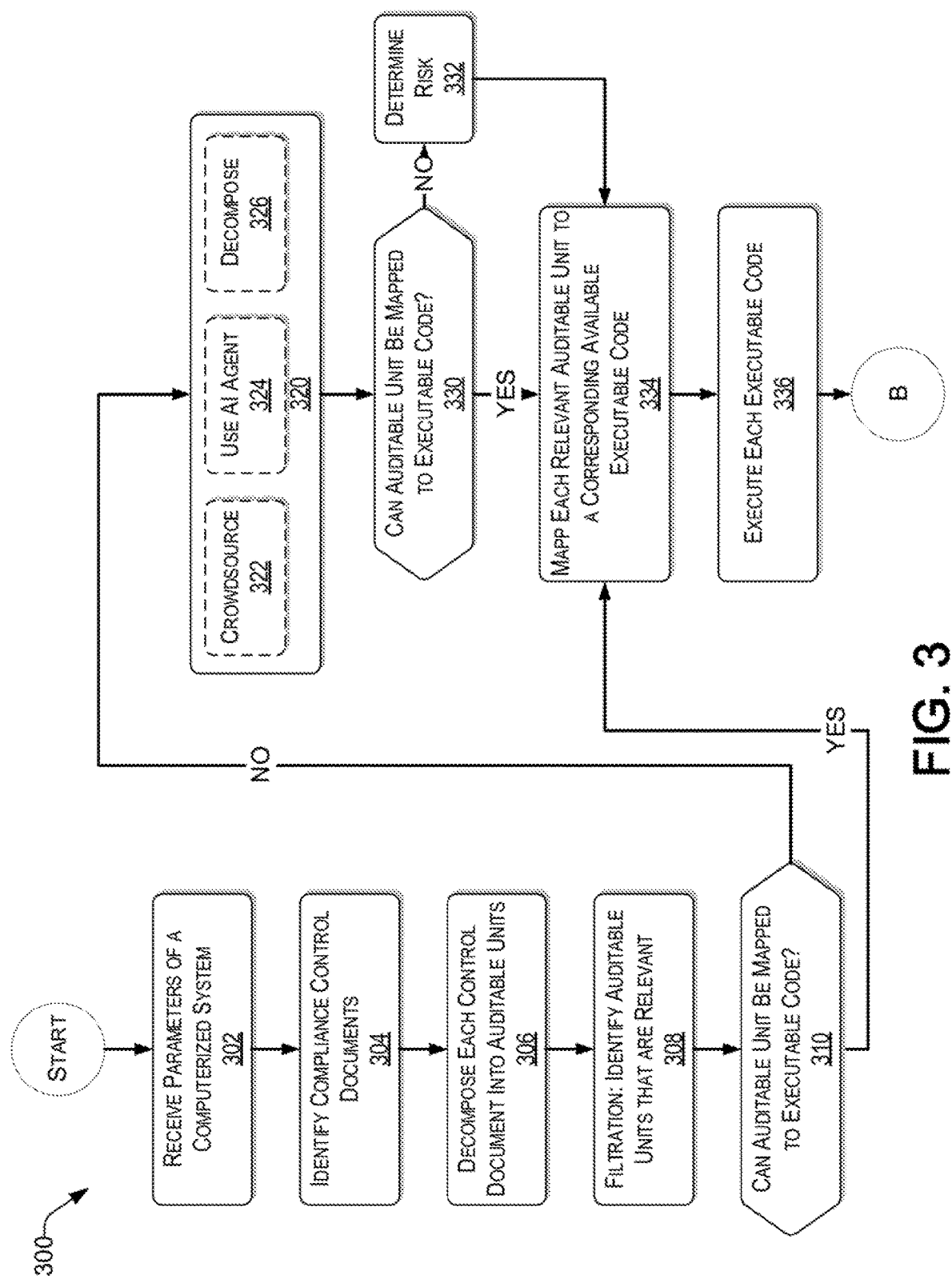
FIG. 3 presents an illustrative process for identification of relevant compliance control documents and identification of executable code to determine compliance.
Figure 4:
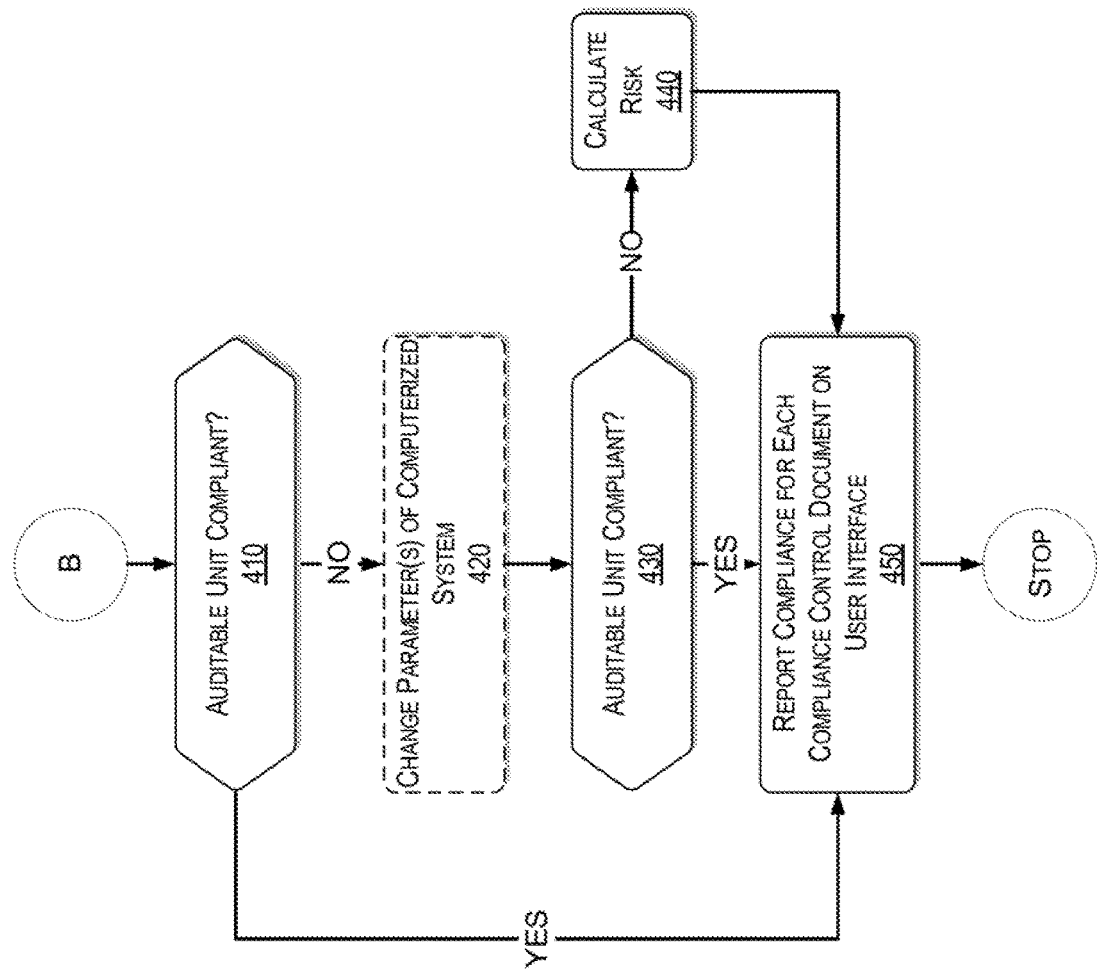
FIG. 4 presents an illustrative process for determining a compliance of a computerized system.

With the foregoing overview of the example architecture 100 and conceptual block diagram of a system 200, it may be helpful now to consider a high-level discussion of example processes. To that end, FIGS. 3 to 4 present illustrative processes related to various aspects of assessing compliance of a computerized client domain, determining compliance risk involved, and providing solutions to mitigating compliance risk. Processes 300 and 400 are illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 300 and 400 are described with reference to the architecture 100 of FIG. 1.

FIG. 3 presents an illustrative process 300 for identification of relevant compliance control documents and identification of executable code to determine compliance. At block 302, internal parameters of a computerized system, sometimes referred to herein as a client domain, are received by the compliance engine 103. In various embodiments, the parameters may be received at predetermined intervals or upon a trigger event.

At block 304, one or more compliance control documents that relate to the computerized system are identified.

At block 306, each compliance control document is decomposed into one or more auditable units. Each auditable unit is operative to provide one or more criteria for compliance for testing the corresponding auditable unit.

At block 308, filtration is performed by the compliance engine 103. More particularly, auditable units that are relevant to the computerized system, from the one or more auditable units of each control document, are identified. Auditable units that are not relevant to the computerized system are filtered out, while those that are relevant are retained. In one embodiment, the relevance is determined by the compliance engine 103 based on the received internal parameters.

At block 310, for each relevant auditable unit, the compliance engine 103 determines whether the auditable unit can be mapped to an executable code from the technology stack 114. If so, ("YES" at decision block 310), the process continues with block 334, discussed below. If not, ("NO" at decision block 310), in one embodiment, the process continues with block 320, where at least one of: (i) crowdsourcing 322 is used to find relevant code that could be used for mapping, (ii) artificial intelligence 324 is used to source the relevant code that could be used for mapping, or (iii) the auditable unit is decomposed 326 into sub-units to find smaller units of code for substantial compliance (if complete compliance cannot be achieved), thereby mitigating risk.

Accordingly, block 320 represents a more involved effort to identify relevant code for which executable code may not be readily available in the technology stack 114 for an auditable unit.

At block 330, for each auditable unit, the compliance engine 103 determines whether the auditable unit can be mapped to an executable code. In some embodiments, the determination is only for auditable units evaluated in block 320. If an auditable unit (or sub-unit) cannot be mapped to an executable code (i.e., "NO" at decision block 330), the process continues with block 332, where a risk for the auditable unit (or sub-unit) is calculated. If an auditable unit (or sub-unit) can be mapped to an executable code (i.e., "YES" at decision block 330), the process continues with block 334.

At block 334, each relevant auditable unit is mapped to a corresponding executable code.

At block 336, each mapped executable code is executed, thereby testing each corresponding auditable unit (and/or sub-unit) for compliance.

In some embodiments, process 300 includes a preliminary stage where the repository of compliance control documents is created and maintained in the regulation repository by the compliance engine 103. In one embodiment, the decomposition of the compliance control documents is not only performed by the compliance engine 103 for the relevant compliance control documents, but for all compliance control documents during this preliminary stage. In this regard, blocks 304 and 306 are replaced by with block 307 (not shown), which is operative to retrieve relevant auditable units from the regulation repository 112.

Reference now is made to FIG. 4, which presents an illustrative process 400 for determining a compliance of a computerized system. In one embodiment, process 400 is a continuation of process 300.

At block 410, the compliance engine 103 determines whether each identified relevant auditable unit is compliant. If so, ("YES" at decision block 410), the process continues with block 450, discussed below. If compliance for one or more of the identified relevant auditable units is not achieved ("NO" at decision block 410), the process may continue with block 420.

In one embodiment, the executable code mapped to the corresponding auditable unit, is further operative to change one or more internal parameters of the computerized system to achieve compliance of the auditable unit (or sub-unit) (i.e., block 420). For example, the auditable unit may test whether multi-factor authentication is used for login. Upon determining that the auditable unit is not compliant, the executable code can change the internal parameters of the computerized system to include multi-factor authentication. In some embodiments, approval from an administrator of the computerized system is solicited and the adjustment to the one or more internal parameters is performed upon receipt of the confirmation.

At block 430, the compliance engine 103 determines whether each identified relevant auditable unit is compliant. In some embodiments, the determination is based on auditable units that are affected by the change of internal parameters of block 420. If compliance for one or more of the identified relevant auditable units (or the units affected by block 420) is not achieved ("NO" at decision block 410), the process continues with block 440, where the risk of each auditable unit (or sub-unit) that is not compliant is calculated. If compliance is achieved, ("YES" at decision block 410), the process continues with block 450, where a report is created that includes a compliance risk for each compliance control document. The report is configured to be displayed on a user interface of a computing device. For example, for each compliance control document, the total risk exposure is calculated based on auditable units (and/or sub-units) that are not compliant and/or could not be successfully mapped to an executable code for testing. Stated differently, for each compliance control document all units and sub-units that are not compliant or could not be tested are tabulated to determine a compliance risk. In one embodiment, whether an auditable unit (or sub-unit) is compliant, non-compliant, or cannot be tested, is indicated by suitable markings (e.g., check mark, cross, circle, color code, etc.).

Example Computer Platform

Figure 5:
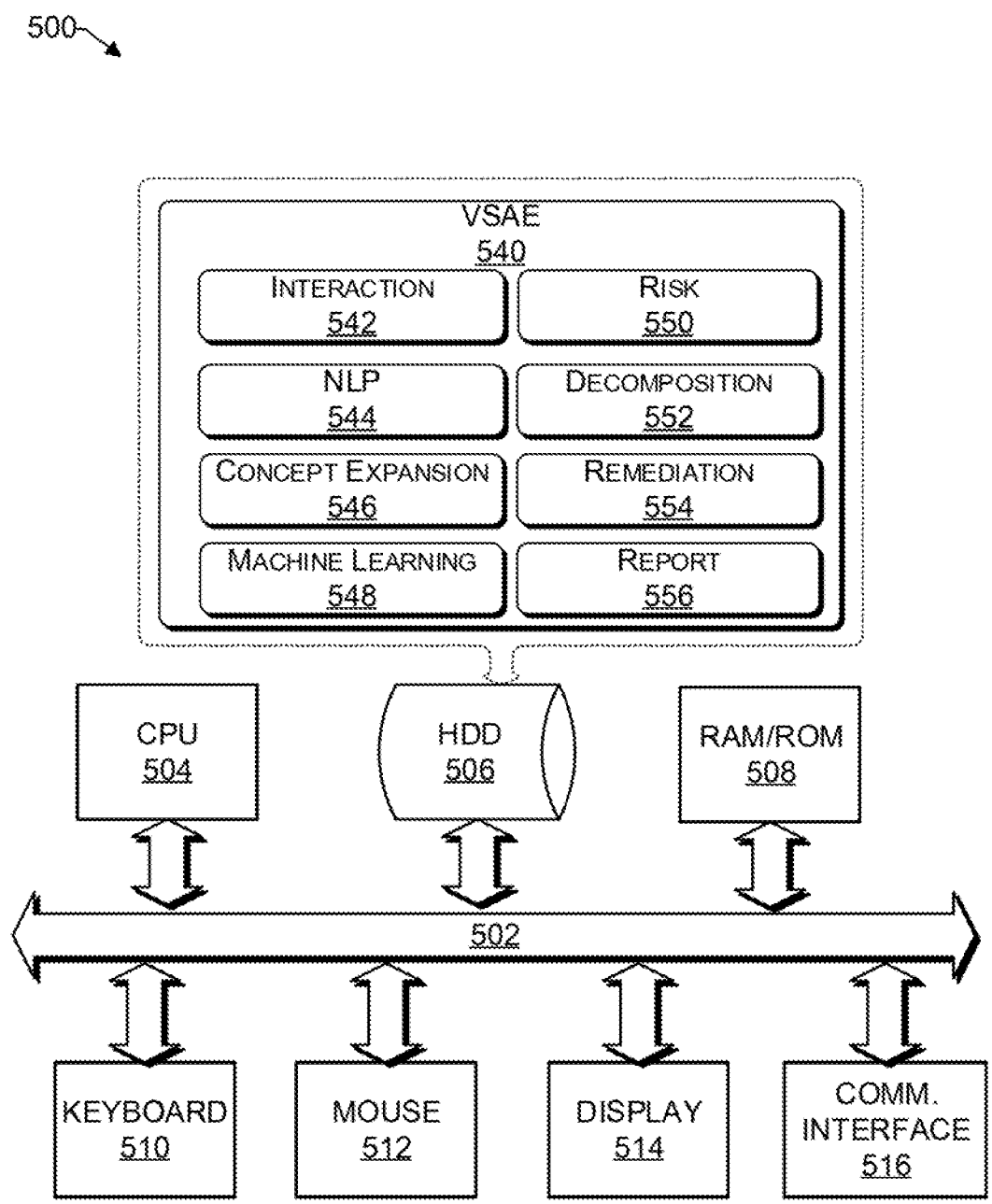
FIG. 5 is a functional block diagram illustration of a computer hardware platform that can communicate with various networked components, consistent with an illustrative embodiment.

As discussed above, functions relating to managing compliance of client domain, can be performed with the use of one or more computing devices connected for data communication via wireless or wired communication, as shown in FIG. 1 and in accordance with the processes 300 to 400 of FIGS. 3 to 4, respectively. FIG. 5 provides a functional block diagram illustration of a computer hardware platform that is capable of communicating with a regulation repository, identifying relevant compliance control documents for a client domain, identifying appropriate executable code for each auditable unit of a compliance control document, curing issues of non-compliance, and identifying compliance risk, as discussed herein. In particular, FIG. 5 illustrates a network or host computer platform 500, as may be used to implement an appropriately configured server, such as the compliance server 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the compliance engine 540, in a manner described herein. The compliance engine 540 may have various modules configured to perform different functions.

For example, there may be an interaction module 542 that is operative to receive electronic data from various sources, including the regulation repository 112, technology stack 114, domain database 118 crowdsource element 110, one or more client domains 102(1) to 102(N), and data provided by the cloud 120. The interaction module 542 may also be configured to present compliance results with respect to compliance control documents relevant to a client domain, to an appropriate recipient (e.g., an administrator of the client domain being evaluated).

In one embodiment, there is a natural language processing (NLP) module 544 operative to process the raw natural language content of each compliance control document or internal parameters of a client domain. There may be a concept expansion module 546, operative to identify the concept cues in each compliance control document or internal parameters to determine the intent thereof. There may be a machine learning module 548 operative to learn from prior interactions with one or more client domains, during a training phase. The machine learning module 548 may also aid in identifying an appropriate source of an executable code for an auditable unit of a compliance control document.

In one embodiment, there is a risk module 550 operative to determine a compliance risk associated with each auditable unit (or sub-unit). There may be a decomposition module 552 operative to decompose an auditable unit into smaller units that have a potential solution(s) in the form of available code. There may be a remediation module 554 that is operative to automatically cure elements of an auditable unit that are not compliant. There may be a report module 556 operative to cooperate with the risk module 550 to determine a compliance risk associated with each compliance control document that is relevant to a subject client domain. The report module 556 is operative to send the report at predetermined intervals or upon a trigger event, to an appropriate recipient in a format that readily reveals which units (and sub-units) of a compliance control document of a client domain are compliant and the associated risk with those that are not compliant or compliance could not be verified.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
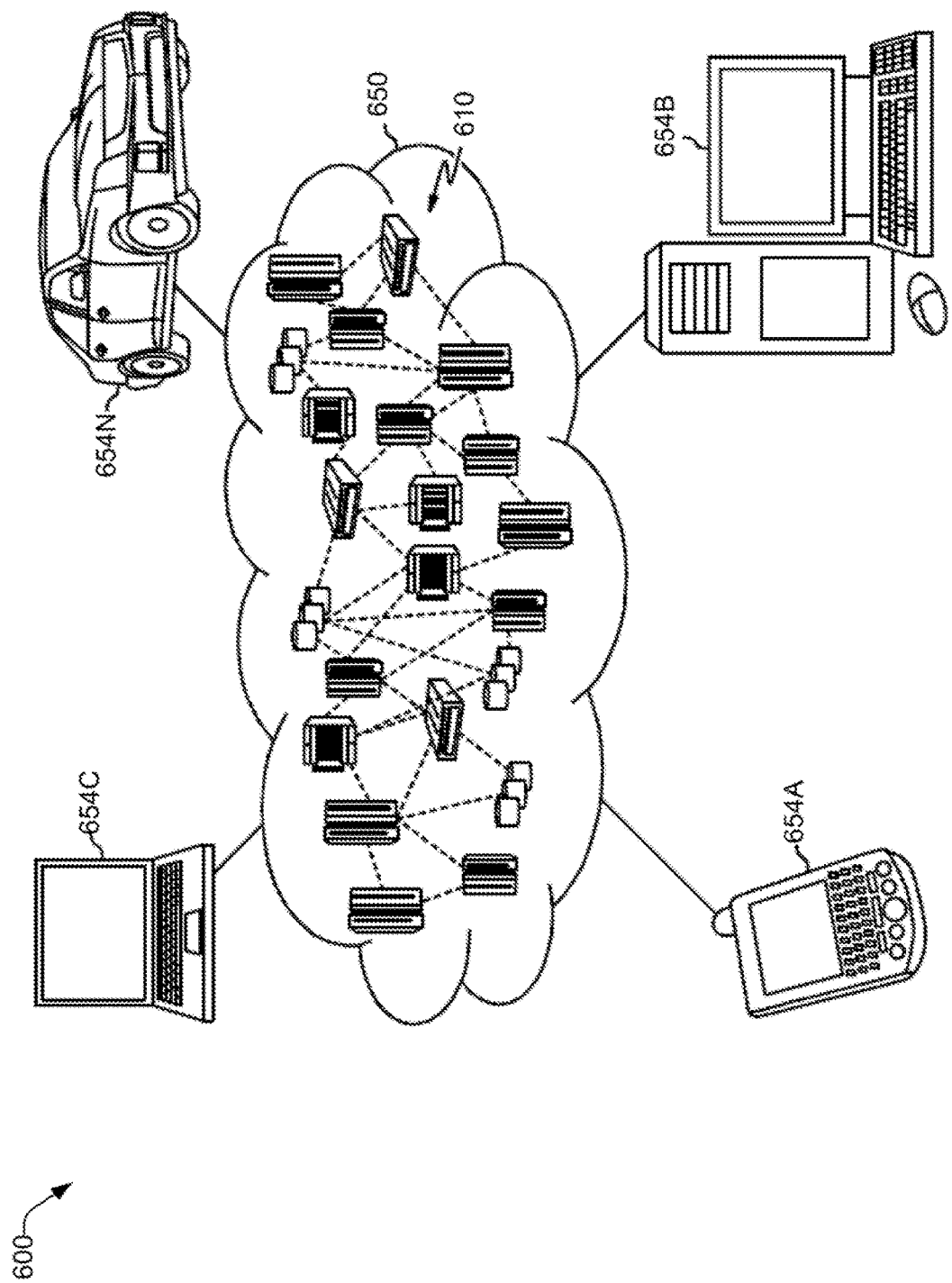
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
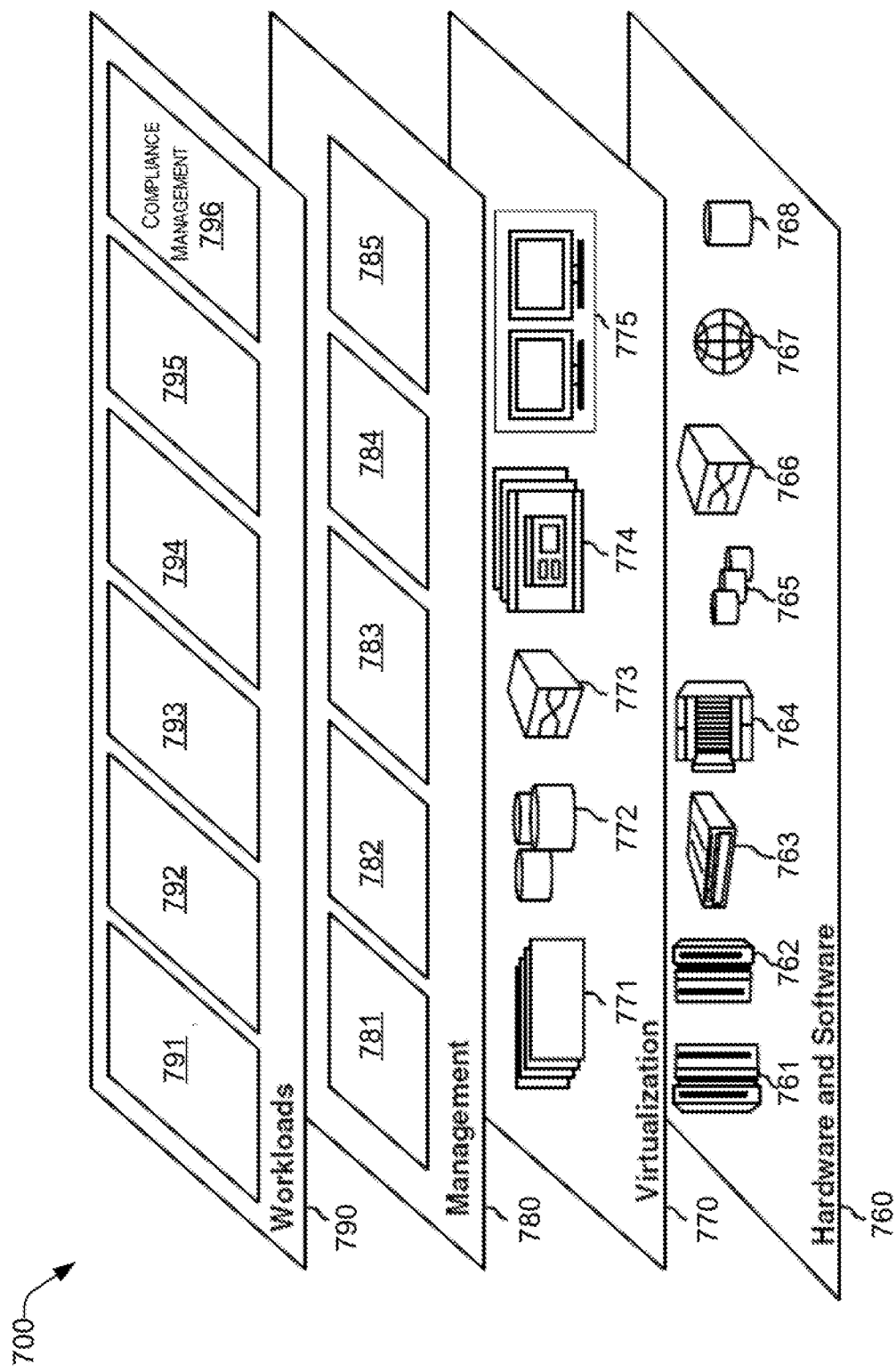
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and managing compliance of a client domain 796, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a compliance engine code stored in the storage device, wherein an execution of the compliance engine code by the processor configures the computing device to perform acts comprising:
receiving internal parameters of a system;
identifying one or more compliance control documents that relate to the system;
decomposing each compliance control document into one or more auditable units and identifying the auditable units relevant to the system;
for each relevant auditable unit, mapping the relevant auditable unit to a corresponding executable code available in a technology stack and operative to determine whether the auditable unit is compliant with its corresponding compliance control document;
executing each mapped executable code;
identifying a risk associated with each relevant auditable unit that is deemed to be not compliant by its corresponding executable code available in the technology stack;
for each compliance control document, calculating a compliance risk based on the identified risk; and
creating a compliance risk report of for each document to be displayed on a user interface of a computing device over the network interface.

2. The computing device of claim 1, wherein the internal parameters of the system comprise at least one of:
a type of industry of the system;
a geographical location of the system;
a hardware infrastructure of the system; or
a software infrastructure of the system.

3. The computing device of claim 2, wherein the internal parameters of the system further comprise at least one of:
internal regulations of the system; or
an interpretation of regulations by the system of one or more control units of the one or more compliance control documents.

4. The computing device of claim 1, wherein:
execution of the compliance engine code by the processor further configures the computing device to perform acts comprising: for each auditable unit that cannot be mapped to a corresponding executable code of the technology stack, identifying a risk associated with the auditable unit, and
the calculation of the compliance risk includes the identified risk associated with each relevant auditable unit that cannot be mapped.

5. The computing device of claim 1, wherein execution of the compliance engine code by the processor further configures the computing device to perform acts comprising, for each auditable unit that cannot be mapped to a corresponding executable code of the technology stack:
decomposing the relevant auditable unit into sub-units; and
mapping each sub-unit to a corresponding available executable code from the technology stack.

6. The computing device of claim 5, wherein:
identifying a risk associated with each relevant auditable unit includes each sub-unit that is deemed to be not compliant by its corresponding executable code; and
identifying a risk associated with each relevant auditable unit includes each sub-unit that cannot be mapped to a corresponding executable code of the technology stack.

7. The computing device of claim 1, wherein execution of the compliance engine code by the processor further configures the computing device to perform acts comprising: for at least one relevant auditable unit that cannot be mapped to a corresponding executable code of the technology stack:
distributing parameters of the auditable unit on social media for crowdsourcing; and
receiving, via the crowdsourcing, an executable code operative to determine whether the auditable unit is compliant with its corresponding compliance control document.

8. The computing device of claim 1, wherein execution of the compliance engine code by the processor further configures the computing device to perform acts comprising: maintaining a repository of the compliance control documents.

9. The computing device of claim 1, wherein identifying auditable units that are relevant to the system comprises:
identifying, from the received internal parameters, at least one of:
a hardware infrastructure of the system; or
a software infrastructure of the system;
for each auditable unit, determining whether the auditable unit is compatible with at least one of the hardware or software infrastructure of the system; and
removing auditable units that are not compatible.

10. The computing device of claim 1, wherein execution of the compliance engine code by the processor further configures the computing device to perform acts comprising:
identifying an interpretation, by the system, of an auditable unit of the one or more compliance control documents; and
adjusting the auditable unit based on the identified interpretation by the system.

11. The computing device of claim 1, wherein an executable code of a subject mapped relevant auditable unit is operative to, upon determining that the subject auditable unit is not compliant, adjusting one or more internal parameters of the system to achieve compliance for the subject auditable unit.

12. A non-transitory computer readable storage medium tangibly embodying a computer readable program code having computer readable instructions that, when executed, causes a computer device to carry out a method of managing a compliance of a system, the method comprising:
receiving internal parameters of a system;
identifying one or more compliance control documents that relate to the system;
decompose each compliance control document into one or more auditable units;
identifying auditable units, from the one or more auditable units of each control document, that are relevant to the system;
for each relevant auditable unit, mapping the relevant auditable unit to a corresponding executable code available in a technology stack and, operative to determine whether the auditable unit is compliant with its corresponding compliance control document;
executing each mapped executable code;
identifying a risk associated with each relevant auditable unit that is deemed to be not compliant by its corresponding executable code; for each compliance control document, calculating a compliance risk based on the identified risk; and creating a compliance risk report of for each document to be displayed on a user interface of a computing device of the system.

13. The non-transitory computer readable storage medium of claim 12, wherein the internal parameters of the system comprise at least one of:
   a type of industry of the system;
   a geographical location of the system;
   a hardware infrastructure of the system; or
   a software infrastructure of the system.

14. The non-transitory computer readable storage medium of claim 13, wherein the internal parameters of the system further comprise at least one of:
   internal regulations of the system; or
   an interpretation of regulations by the system of one or more control units of the one or more compliance control documents.

15. The non-transitory computer readable storage medium of claim 12, further comprising: identifying a risk associated with each relevant auditable unit that cannot be mapped to a corresponding executable code of the technology stack, wherein the calculation of the compliance risk includes the identified risk associated with each relevant auditable unit that cannot be mapped.

16. The non-transitory computer readable storage medium of claim 15, further comprising: for each relevant auditable unit that cannot be mapped to a corresponding executable code of the technology stack:
   decomposing the relevant auditable unit into sub-units; and
   mapping each sub-unit to a corresponding available executable code from the technology stack.

17. The non-transitory computer readable storage medium of claim 16, wherein:
   identifying a risk associated with each relevant auditable unit includes each sub-unit that is deemed to be not compliant by its corresponding executable code; and
   identifying a risk associated with each relevant auditable unit includes each sub-unit that cannot be mapped to a corresponding executable code of the technology stack.

18. The non-transitory computer readable storage medium of claim 15, further comprising: for at least one relevant auditable unit that cannot be mapped to a corresponding executable code of the technology stack:
   distributing parameters of the auditable unit on social media to crowdsource an executable code operative to determine whether the auditable unit is compliant with is corresponding compliance control document; and
   receiving, via the crowdsourcing, the executable code for the auditable unit.

19. The non-transitory computer readable storage medium of claim 12, further comprising: maintaining a repository of the compliance control documents.

20. The non-transitory computer readable storage medium of claim 12, wherein identifying auditable units that are relevant to the system comprises:
   identifying, from the received internal parameters, at least one of:
      a hardware infrastructure of the system; or
      a software infrastructure of the system;
   for each auditable unit, determining whether the auditable unit is compatible with at least one of the hardware or software infrastructure of the system; and
   removing auditable units that are not compatible.

* * * * *